United States Patent [19]
Loffler

[11] 3,759,542
[45] Sept. 18, 1973

[54] AXLE SUSPENSION ON ESPECIALLY REAR AXLE SUSPENSION FOR MOTOR VEHICLES

[75] Inventor: Erwin Löffler, Friedrichshofen, Germany

[73] Assignee: Daimler-Benz Aktiengesellschaft, Stuttgart-Unterturkheim, Germany

[22] Filed: June 4, 1971

[21] Appl. No.: 150,097

[30] Foreign Application Priority Data
June 6, 1970  Germany................... P 20 27 885.7

[52] U.S. Cl.......................... 280/124 A, 180/73 TL
[51] Int. Cl........................................... B60g 11/32
[58] Field of Search.................. 280/124 A, 124 R; 180/73

[56] References Cited
UNITED STATES PATENTS

| | | | |
|---|---|---|---|
| 3,177,965 | 4/1965 | Dews | 280/124 A X |
| 3,202,237 | 8/1965 | Dreisziger | 280/124 A X |
| 3,327,803 | 6/1967 | Cote | 180/73 TL |
| 3,473,821 | 10/1969 | Barenyi | 180/73 R |

Primary Examiner—Philip Goodman
Attorney—Craig, Antonelli & Hill

[57] ABSTRACT

An axle suspension, especially a rear axle suspension of motor vehicles in which the wheel carrier is guided by cross and longitudinal guide elements whereby the wheel carrier which carries the wheel journal forms one part of a telescopic spring leg adapted to be lengthened and shortened under spring action which is pivotally connected with at least one longitudinal and cross guide element each.

30 Claims, 3 Drawing Figures

INVENTOR
ERWIN LÖFFLER

BY Craig, Antonelli & Hill

ATTORNEYS

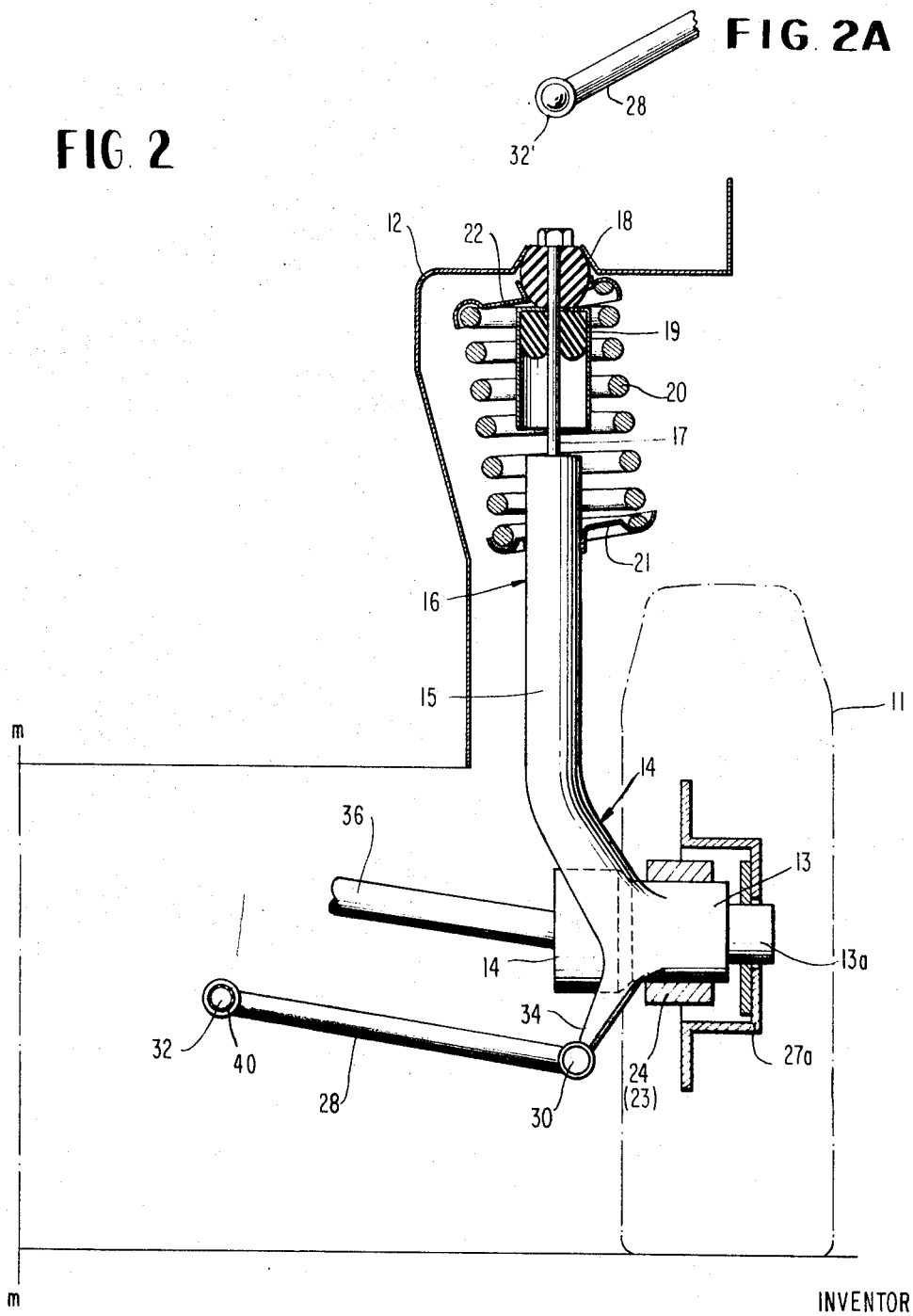

AXLE SUSPENSION ON ESPECIALLY REAR AXLE SUSPENSION FOR MOTOR VEHICLES

The present invention relates to an axle suspension, especially rear axle suspension for motor vehicles in which the wheel carrier is guided by means of cross and longitudinal guide members.

The present invention aims above all at an axle suspension with low weight and slight space requirements which makes possible at the same time a completely satisfactory wheel guidance as well as a high braking and starting equalization, and essentially consists in that the wheel carrier carrying the wheel journal forms one element of a spring leg adapted to be shortened or lengthened telescopically under spring action which is pivotally connected with at least one longitudinal and one cross guide member each.

With such a wheel guidance, the longitudinal guidance of the wheel is taken over by the longitudinal guide member acting as push brace or thrust strut whereas the wheel guidance in a plane transversely to the vehicle is taken over by the cross guide member or members, each in conjunction with the spring leg.

Since the spring leg can be constructed with small diameter, it can be accommodated in a small space, for example, in the vertical plane of the longitudinal guide member. This offers, especially with upright springs, the possibility to arrange the spring leg so close to the wheel that a large luggage space width is made possible. The cross guide member or members can be arranged in a low position for the support of the wheel in the vehicle cross direction so that the space above these cross guide members is available for other constructional parts. It is thereby also unnecessary even with large spring paths to press-in the luggage floor in the upward direction so that a low, flat luggage floor can be provided. The forces acting between wheel and vehicle superstructure may be additionally introduced spatially into the vehicle superstructure, for example, into a frame floor structure, advantageously at such places at which the vehicle superstructure can be constructed particularly rigid without any difficulties and which therefore are suited particularly for the reliable absorption of the forces. Furthermore, by the introduction of the wheel guidance forces into rigid zones of the floor structure, the rolling off noises of the wheel can be kept small by reason of the slight vibrational excitations of the surrounding sheet metal surfaces.

In a preferred embodiment of the present invention, the longitudinal guide member with which the wheel carrier is rotatably connected about the axis of the wheel pin or journal, is universally pivotally supported at the vehicle superstructure and is constructed laterally flexible in bending as well as torsionally elastic whereas the cross guide members or members are connected with the wheel carrier by means of hinge-like joints having a longitudinal yieldingness, such as rubber or ball joints.

By the corresponding yieldingness in the joints of the longitudinal and cross guide members, a longitudinal spring action of the wheel is additionally attainable, for example, as a result of impacts acting in the vehicle longitudinal direction, without causing practically any faults as regards the toe-in of the suspension. Preferably, a relatively soft rubber cushion is provided for this purpose in the bearing joints connecting of the longitudinal guide members whereas the bearing joints connecting the cross guide members with the vehicle superstructure and/or the wheel carrier which have only a slight yieldingness or elasticity in the guide direction, for example, by means of rubber bushes or possibly also ball joints, permit a swinging movement of the cross guide rods in the vehicle longitudinal direction.

Furtheremore, such a guidance of the wheel carrier by means of longitudinal and cross guide members is advantageously provided that the toe-in increases during inward spring deflections. A particularly good steering and guide stability can be achieved when driving through curves in that the skidding danger is decreased by the counter-steering of the primarily loaded inwardly spring-deflected wheels. In particular, two mutually parallel or approximately parallel cross-guide members of differing lengths connected with the wheeel carrier by means of identical hinge axes may be provided for this purpose in such a manner that the wheel carrier is pivotally guided about a pivot axis extending obliquely forwardly and outwardly. This effect can be attained, for example, also by the dissimilar height of the bearing supports of the guide members at the floor structure of the vehicle superstructure or at the wheel carrier.

It is further of particular advantage if the longitudinal guide member is arranged inclined in the direction of action of the forces occurring during the starting of the vehicle so that a 100 percent starting equalization can be attained. In the practical construction, the angle of inclination to the road surface will amount as a rule to about 12°.

The brake saddle is appropriately rigidly connected with the longitudinal guide member, especially in such a manner that only forces in the direction of the spring leg axis result and the spring leg therefore does not jam during the braking. At the same time, a brake equalization of 100 percent or —as frequently desired—of more than 100 percent is attained thereby.

For increasing the curve stability, the forward bearing supports of the longitudinal guide members serving as thrust struts may be connected with each other by a torsion rod.

Accordingly, it is an object of the present invention to provide an axle suspension, especially a rear axle suspension of motor vehicles, which avoids by simple means the aforementioned shortcomings and drawbacks encountered in the prior art.

Another object of the present invention resides in an axle suspension, especially for rear axles of motor vehicles which assures a completely satisfactory wheel guidance in conjunction with low weight and small space requirements.

A further object of the present invention resides in an axle suspension of the type described above which makes possible a high braking and starting equalization.

A still further object of the present invention resides in an axle suspension, especially a rear axle suspension for motor vehicles, which makes possible an advantageous design of the luggage space as regards width and flatness of its floor.

Another type of the present invention resides in an axle suspension of the type described above which permits a reliable absorption of the forces that occur without special, costly reinforcements of structural parts and at the same time minimizes noises due to the rolling-off action on the part of the wheels.

A further object of the present invention resides in an axle suspension of the type described above which not only reduces the skidding danger, especially when driving through curves, but additionally permits favorable guide kinematics of the wheels.

These and further objects, features and advantages of the present invention will become more obvious from the following description when taken in connection with the accompanying drawing which shows, for purposes of illustration only, one embodiment in accordance with the present invention, and wherein:

FIG. 2 is a longitudinal side view thereof;

FIG. 2A is a partial schematic view illustrating a ball joint arrangement for the cross guide members.

Figure 1:
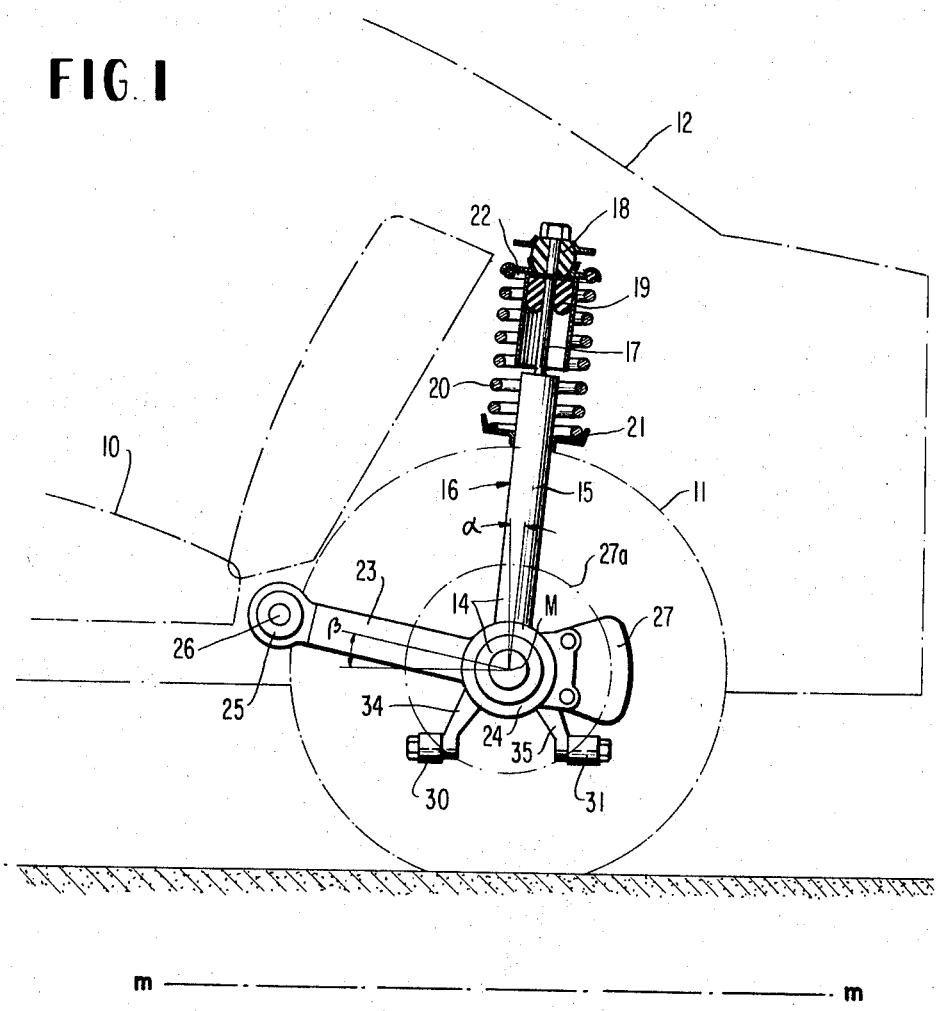
FIG. 1 is a side elevational view of the wheel suspension in accordance with the present invention.

Referring now to the drawings wherein like reference numerals are used throughout the various views to designate like parts, and more particularly to FIG. 1, the rear wheels 11 are suspended at the vehicle superstrucure 12, indicated only schematically, to the rear of the rear seats 10 of the motor vehicle. The wheels 11 are rotatably supported by means of the axle member 13a thereof (FIG. 2) within the sleeve-shaped wheel pin or journal 13 of the wheel carrier generally designated by reference numeral 14 which is made in one piece with the one part 15 of the spring leg generally designated by reference numeral 16 or is rigidly connected with this part 15. The other, piston-like part of the spring leg 16 is elastically supported at the vehicle superstructure 12 by a piston rod 17 under interposition of a rubber cushion 18 whereby a rubber cushion 19 may limit the stroke of the spring leg 16. The spring leg, for example, a hydrodpneumatic spring, may be constructed as the sole spring, or may be used also in combination with a further spring, for example, a coil spring 20 which may also serve as main spring and may be supported, on the one hand, by means of a spring abutment 21 at the lower part 15 of the spring leg 16 and by means of a spring abutment 22 at the vehicle superstructure or at the rubber cushion 18 or also at the part 17 of the spring leg. Furthermore, this spring leg 16 may also be constructed as a partially carrying spring leg which keeps constant the level of the vehicle in case of different vehicle loads. Preferably the spring leg 16 is inclined in the vertical longitudinal plane rearwardly about an angle $\alpha$ (FIG. 1) to the vertical so that the direction of action of the spring system includes a spring component in the longitudinal direction of the vehicle.

A longitudinal guide mmeber 23 serving as thrust strut or push brace is supported by means of its hub 24 on the hollow cylindrical pin or journal 13 of the wheel carrier 14. The longitudinal guide member 23 is constructed as laterally bendable and torsionally elastic rod and is universally pivotally supported elastically, preferably with great elasticity in the vehicle longitudinal direction, at the vehicle superstructure 12 about a cross axis 26 under interposition of a rubber bushing 25. In the center rest position of the wheel, the longitudinal guide member 23, i.e., the straight connecting line between the center point M of the wheel and the axis 26 of the longitudinal guide member is inclined at an angle $\beta$ (FIG. 1) to the horizontal. The inclination is thereby so selected, as a rule about 12°, that the starting resultant acting during the starting of the vehicle in the center point M, passes through the axis 26 of the longitudinal guide member 23 and a 100 percent starting equalization is achieved thereby. Furthermore, the brake saddle 27 for the wheel brake 27a of conventional construction is advantageously rigidly connected with the longitudinal guide member 23 or with the hub 24 rotatably supported on the wheel journal 13 about the wheel center axis. A brake equalization of 100 percent or more can be achieved thereby.

Furthermore, two mutually parallelly arranged lower cross guide members 28 and 29 serve for the guidance of the wheel in the cross direction of the vehicle which are pivotally connected, on the one hand, by means of coaxially arranged hinge joints 30 and 31 with a joint axis extending in the longitudinal direction of the vehicle at the wheel carrier 14 and on the other, by means of hinge joints 32 and 33 at the vehicel superstructure, preferably each by interposition of rubber, appropriately relatively hard rubber bushings. In FIG. 2, rubber bushing 40 is illustrated for joint 32, it being understood that the other joints could have similar rubber bushings. These joints may also be constructed as ball joints as shown schematically at 32' in FIG. 2A.

The two cross guide members 28 and 29 have different lengths in that the axes of the hinge joints 32 and 33 are mutually offset in the cross direction of the vehicle so that the wheel carrier 14 pivots about a pivot axis extending forwardly outwardly, approximately determined by the joints 32 and 33 and possibly more or less offset to the rubber bushing 25 and a slight increase of the toe-in occurs during inward spring deflection of the wheel. This effect is achieved essentially in that the cross guide member 28 is shorter than the cross guide member 29 so that during inward spring deflections and possibly also during outward spring deflections, the joint 30 moves more rapidly toward the inside than the joint 31. This can eventually also be achieved by a different height of the joints 32, 33, 30 and 31.

In case of shocks impinging on the wheel in the vehicle longitudinal direction, the longitudinal guide member 23 is able to yield in the vehicle longitudinal direction in the rubber cushion 25 whereby the wheel carrier 14 is guided practically parallelly by the cross guide members 28 and 29 arranged parallel or approximately parallel to one another in the manner of a guide rectangle as viewed in plan view, i.e., is able to yield without faulty change of the toe-in.

The two cross guide members 28 and 29 are arranged as low as possible below the wheel center M insofar as the necessary floor clearance permits the same. For this purpose, the joints 30 and 31 are disposed at the ends of downwardly directed arms 34 and 35 of the wheel carrier 14 which is also advantageous for the absorption of forces and moments as the distance of the joints 30 and 31 from the upper support point at 18 is thereby as large as possible.

Figure 3:
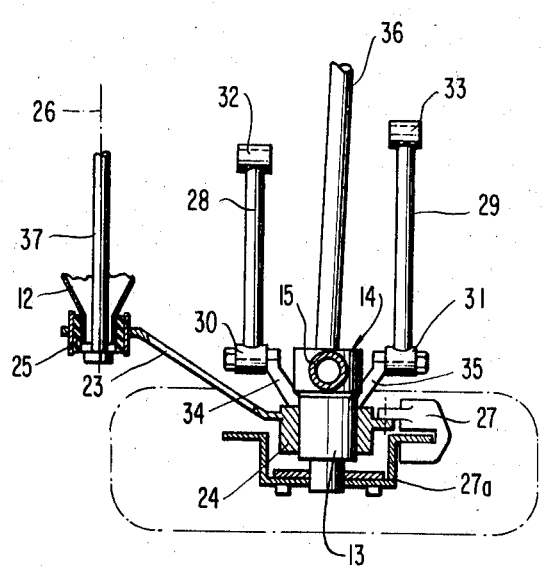
FIG. 3 is a partial plan view on the wheel suspension of FIGS. 1 and 2.

For example, a joint shaft 36 serves for the drive of the wheel which receives, in turn, its drive by an axle gear arranged approximately in the vertical longitudinal center plane $m-m$ (FIG. 3) of the vehicle and arranged at the vehicle superstructure.

Furthermore, the two joints of the longitudinal guide members 23 on the superstructure side may be connected with each other in the cross joint axis 26 thereof by a torsion rod 37 serving as stabilizer.

While I have shown and described only one embodiment in accordance with the present invention, it is understood that the same is not limited thereto but is susceptible of numerous changes and modifications as known to those skilled in the art. For example, the brake saddle, instead of being secured at the longitudinal or thrust guide member may also be secured at the spring leg or at a part rigidly connected therewith. However, in this case the brake equalization is smaller than is the case with the brake saddle secured at the longitudinal guide member. Also, the arrangement with the brake saddle secured at the longitudinal guide member offers the advantage that the spring leg is not stressed in a manner causing jamming when the brakes are applied.

Thus, it is obvious that the present invention is susceptible of numerous changes and modifications as known to those skilled in the art, and I therefore do not wish to be limited to the details shown and described herein but intend to cover all such changes and modifications as are encompassed by the scope of the appended claims.

I claim:

1. An axle suspension for a vehicle with a superstructure with a wheel carrier means guided by cross and longitudinal guide means, characterized in that the wheel carrier means carrying a wheel journal forms part of a spring leg means adapted to be shortened and lengthened telescopically under spring action, said spring leg means being pivotally connected with at least one longitudinal and cross guide means each, and in that the longitudinal guide means is rotatably connected with the wheel carrier means about the axis of the wheel journal, is universally pivotally supported at the vehicle superstructure and is constructed laterally flexible in bending as well as torsionally elastic, the cross guide means being connected with the wheel carrier means by hinge-like joint means with a longitudinal elasticity.

2. An axle suspension according to claim 1, characterized in that said last mentioned joint means are rubber joints.

3. An axle suspension according to claim 1, characterized in that said last-mentioned joint means are ball joints.

4. An axle suspension arrangement for a vehicle having a vehicle superstructure; said arrangement comprising:
a wheel carrier for supporting a vehicle wheel for rotation about a wheel axis,
a spring leg supporting the wheel carrier in the upward direction with respect to the vehicle superstructure, said spring leg including at least one upper portion and a lower portion displaceable with respect to one another, wherein said lower portion forms a rigid unit with the wheel carrier,
at least one transverse guide member extending in the transverse direction of the vehicle with one end hingedly mounted at the vehicle superstructure and the other end hingedly mounted at the wheel carrier, and a longitudinal guide member extending substantially in the longitudinal direction of the vehicle, one end of said longitudinal guide member being universally resiliently joined to the vehicle superstructure, the other end of said longitudinal guide member including a hub portion for mounting said longitudinal guide member to said d wheel carrier such that said longitudinal guide member is rotatable with respect to said wheel carrier about said wheel axis.

5. An arrangement according to claim 4, characterized in that the spring leg means serves at the same time for the support of a wheel spring which is arranged between the two telescopically nested parts of the spring leg means.

6. An arrangement according to claim 5, characterized in that the spring leg means is constructed at least as partially supporting spring element.

7. An arrangement according to claim 5, characterized in that at least one of the two parts consisting of spring leg means and wheel spring additionall provided is supported by interposition of elastic cushion means at the vehicle superstructure.

8. An arrangement according to claim 7, characterized in that the stroke of the two parts of the spring leg means with respect to each other is limited by elastic cushion means.

9. An arrangement according to claim 8, characterized in that the longitudinal guide members of the two sides of the vehicle are connected with each other at the ends thereof on the side of the superstructure by a torsion rod stabilizer.

10. An arrangement according to claim 4, wherein means of limited elastic resilience are provided in the hinged mountings of the at least one transverse guide member.

11. An arrangement according to claim 10, wherein said means of limited elastic resilience include rubber joints.

12. An arrangement according to claim 10, wherein said longitudinal guide member and said at least one transverse guide member are dimensioned and positioned with respect to said wheel axis and said vehicle superstructure such that, upon relative vertical movement of said wheel axis towards said superstructure and consequent shortening of said spring leg, the wheel carrier is moved such that the toe-in of a wheel supported thereby is increased.

13. An arrangement according to claim 12, wherein said at least one transverse guide member includes two transverse guide members spaced in the longitudinal direction of the vehicle at opposite sides of said wheel axis, and wherein the hinged mountings of the transverse guide members are positioned such that the joint between the transverse guide member and the wheel carrier on the same side of the wheel axis as the longitudinal guide member approaches the vehicle longitudinal centerline more rapidly than the joint between the other transverse guide member and the wheel carrier during said shortening of said spring leg.

14. An arrangement according to claim 12, wherein said at least one transverse guide member includes two approximately parallel transverse guide members which are hingedly mounted at said wheel carrier along a common hinge axis.

15. An arrangement according to claim 14, wherein said transverse guide members are spaced from one another in the longitudinal direction of the vehicle, and wherein the forward most transverse guide member is shorter than the rearward most transverse guide member.

16. An arrangement according to claim 15, wherein said longitudinal guide member extends forwardly of said wheel carrier in the longitudinal direction of the vehicle, wherein said forward most transverse guide member is disposed forwardly of said wheel axis and wherein said rearward most transverse guide member is disposed rearwardly of said wheel axis.

17. An arrangement according to claim 4, wherein said at least one transverse guide member includes two transverse guide members spaced from one another in the vehicle longitudinal direction and hingedly connected at said vehicle superstructure and said wheel carrier with longitudinally extending hinge axes, wherein resilient insert means of relatively high resilience is provided in the hinged connection of the longitudinal guide member and the vehicle superstructure, and wherein resilient insert means of relatively low resilience in the transverse direction are provided in the hinged connections at each end of each of said transverse guide means.

18. An arrangement according to claim 17, wherein each of said resilient insert means are rubber inserts.

19. An arrangement according to claim 18, wherein the hinged connection of the longitudinal guide member at said vehicle superstructure has a relatively large elasticity in the vehicle longitudinal direction.

20. An arrangement according to claim 4, further comprising a brake saddle for a wheel brake, said brake saddle being securely attached to said longitudinal guide member.

21. An arrangement according to claim 20, wherein said wheel axis is associated with a rear wheel of said vehicle, and wherein said longitudinal guide member is inclined upwardly in the forward longitudinal direction with respect to said wheel axis.

22. An arrangement according to claim 4, wherein said wheel axis is associated with a rear wheel of said vehicle, and wherein said longitudinal guide member is inclined upwardly in the forward longitudinal direction with respect to said wheel axis.

23. An arrangement according to claim 17, wherein said wheel axis is associated with a rear wheel of said vehicle, and wherein said longitudinal guide member is inclined upwardly in the forward longitudinal direction with respect to said wheel axis.

24. An axle suspension arrangement for a vehicle having a vehicle superstructure; said arrangement comprising:
  a wheel carrier for supporting a vehicle wheel for rotation about a wheel axis,
  a spring leg supporting the wheel carrier in the upward direction with respect to the vehicle superstructure, said spring leg including at least one upper portion and a lower portion displaceable with respeect to one another, wherein said lower portion forms a rigid unit with the wheel carrier,
  at least one transverse guide member extending in the transverse direction of the vehicle with one end hingedly mounted at the vehicle superstructure and the other end hingedly mounted at the wheel carrier, and a longitudinal guide member extending substantially in the longitudinal direction of the vehicle, one end of said longitudinal guide member being joined to the vehicle superstructure, the other end of said longitudinal guide member being connected to said wheel carrier, wherein said longitudinal guide member and said at least one transverse guide member are dimensioned and positioned with respect to said wheel axis and said vehicle superstructure such that, upon relative vertical movement of said wheel axis towards said superstructure and consequent shortening of said spring leg, the wheel carrier is moved such that the toe-in of a wheel supported thereby is increased.

25. An arrangement according to claim 24, wherein said at least one transverse guide member includes two transverse guide members spaced in the longitudinal direction of the vehicle at opposite sides of said wheel axis, and wherein the hinged mountings of the transverse guide members are positioned such that the joint between the transverse guide member and the wheel carrier on the same side of the wheel axis as the longitudinal guide member approaches the vehicle longitudinal centerline more rapidly then the joint between the other transverse guide member and the wheel carrier during said shortening of said spring leg.

26. An arrangement according to claim 24, wherein said at least one transverse guide member includes two approximately parallel transverse guide members which are hingedly mounted at said wheel carrier along a common hinge axis.

27. An arrangement according to claim 26, wherein said transverse guide members are spaced from one another in the longitudinal direction of the vehicle, and wherein the forward most transverse guide member is shorter than the rearward most transverse guide member.

28. An arrangement according to claim 27, wherein said longitudinal guide member extends forwardly of said wheel carrier in the longitudinal direction of the vehicle, wherein said forward most transverse guide member is disposed forwardly of said wheel axis and wherein said rearward most transverse guide member is disposed rearwardly of said wheel axis.

29. An axle suspension arrangement for a vehicle having a vehicle superstructure; said arrangement comprising:
  a wheel carrier for supporting a vehicle wheel for rotation about a wheel axis,
  a spring leg supporting the wheel carrier in the upward direction with respect to the vehicle superstructure, said spring leg including at least one upper portion and a lower portion displaceable with respect to one another, wherein said lower portion forms a rigid unit with the wheel carrier,
  at least one transverse guide member extending in the transverse direction of the vehicle with one end hingedly mounted at the vehicle superstructure and the other end hingedly mounted at the wheel carrier, and a longitudinal guide member extending substantially in the longitudinal direction of the vehicle, one end of said longitudinal guide member being joined to the vehicle superstrucutre, the other end of said longitudinal guide member being connected to said wheel carrier, wherein a brake saddle for a wheel brake is securely attached to said longitudinal guide member.

30. An arrangement according to claim 29, wherein said wheel axis is associated with a rear wheel of said vehicle, and wherein said longitudinal guide member is inclined upwardly in the forward longitudinal direction with respect to said wheel axis.

* * * * *